(12) United States Patent
Kotra et al.

(10) Patent No.: US 11,991,399 B2
(45) Date of Patent: May 21, 2024

(54) APPARATUS AND METHOD FOR DE-BLOCKING FILTERING

(71) Applicant: Huawei Technologies Co., Ltd., Shenzhen (CN)

(72) Inventors: Anand Meher Kotra, Munich (DE); Semih Esenlik, Munich (DE); Zhijie Zhao, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 195 days.

(21) Appl. No.: 17/516,308

(22) Filed: Nov. 1, 2021

(65) Prior Publication Data

US 2022/0060754 A1   Feb. 24, 2022

Related U.S. Application Data

(63) Continuation of application No. 16/531,898, filed on Aug. 5, 2019, now Pat. No. 11,184,643, which is a continuation of application No. PCT/EP2017/057016, filed on Mar. 23, 2017.

(51) Int. Cl.
| | |
|---|---|
| *H04N 19/86* | (2014.01) |
| *H04N 19/117* | (2014.01) |
| *H04N 19/176* | (2014.01) |
| *H04N 19/82* | (2014.01) |

(52) U.S. Cl.
CPC .......... *H04N 19/86* (2014.11); *H04N 19/117* (2014.11); *H04N 19/176* (2014.11); *H04N 19/82* (2014.11)

(58) Field of Classification Search
CPC ...................................... H04N 19/86
USPC ................................................... 375/240.16
See application file for complete search history.

(56) References Cited

U.S. PATENT DOCUMENTS

| | | | |
|---|---|---|---|
| 2013/0101024 A1* | 4/2013 | Van der Auwera | H04N 19/136 |
| | | | 375/E7.125 |
| 2013/0188744 A1 | 7/2013 | Van Der Auwera et al. | |
| 2013/0294525 A1 | 11/2013 | Norkin et al. | |
| 2014/0233659 A1* | 8/2014 | Narroschke | H04N 19/14 |
| | | | 375/240.29 |

(Continued)

FOREIGN PATENT DOCUMENTS

| | | |
|---|---|---|
| CN | 103200402 A | 7/2013 |
| CN | 104284199 A | 1/2015 |

(Continued)

OTHER PUBLICATIONS

U.S. Appl. No. 16/531,898, filed Aug. 5, 2019.

(Continued)

*Primary Examiner* — Yulin Sun
(74) *Attorney, Agent, or Firm* — Leydig, Voit & Mayer, Ltd.

(57) ABSTRACT

A system and method for processing a video stream are provided. When coding or decoding a video stream a de-blocking filtering may be applied for reducing discontinuities caused by use of a block-based video coding. The de-blocking filtering is performed using a filter grid. The size of the filter grid is chosen adaptively based on the processing parameters. The adaptive size of the filtering grid is determined based on the number of samples used and modified in de-blocking filtering of an edge of a coding block. The filtering grid may be used both for vertical and horizontal edge filtering.

17 Claims, 6 Drawing Sheets

(56) References Cited

U.S. PATENT DOCUMENTS

| | | | | |
|---|---|---|---|---|
| 2015/0016518 A1* | 1/2015 | Li | ................... | H04N 19/156 375/240.12 |
| 2015/0154740 A1* | 6/2015 | Jang | ................... | H04N 19/86 375/240.24 |
| 2015/0350687 A1* | 12/2015 | Zhai | ................... | H04N 19/82 375/240.25 |
| 2015/0365671 A1 | 12/2015 | Pu et al. | | |

FOREIGN PATENT DOCUMENTS

| | | |
|---|---|---|
| CN | 106416249 A | 2/2017 |
| WO | 2012096614 A3 | 7/2012 |
| WO | 2013104298 A1 | 7/2013 |

OTHER PUBLICATIONS

Norkin et al., "HEVC Deblocking Filter," IEEE Transactions on Circuits and Systems for Video Technology, vol. 22, No. 12, XP011487156, pp. 1746-1754, Institute of Electrical and Electronics Engineers, New York, New York (Dec. 2012).

Auwera et al., "CE12 Subtest1: Deblocking of New Non-Square Blocks: Edge Shift for AMP," Joint Collaborative Team on Video Coding (JCT-VC) of ITU-T SG16 WP3 and ISO/IEC JTC1/SC29/WG11, 7th Meeting:Geneva, JCTVC-G383, XP030110367, pp. 1-4, International Union of Telecommunication, Geneva, Switzerland (Nov. 21-30, 2011).

Auwera et al., "CE6.b: Report on SDIP Harmonization with Deblocking, MDIS, MDCS, and HE Residual Coding," Joint Collaborative Team on Video Coding (JCT-VC) of ITU-T SG16 WP3 and ISO/IEC JTC1/SC29/WG11, 6th Meeting: Torino, JCTVC-F556, XP030009579, pp. 1-16, International Union of Telecommunication, Geneva, Switzerland (Jul. 14-22, 2011).

"Series H: Audiovisual and Multimedia Systems Infrastructure of Audiovisual Services—Coding of Moving Video, Advanced Video Coding for Generic Audiovisual Services," ITU-T H.264, ITU-T Telecommunication Standardization Sector of ITU, pp. 1-804, International Union of Telecommunication, Geneva, Switzerland (Oct. 2016).

Jang et al., "Parallel Deblocking Filter for QTBT," Joint Video Exploration Team (JVET) of ITU-T SG 16 WP 3 and ISO/IEC JTC 1/SC 29/WG 11, 4th Meeting:Chengdu, CN, JVET-D0044, pp. 1-4, International Union of Telecommunication, Geneva, Switzerland (Oct. 15-21, 2016).

Kawamura et al., "Extended Deblocking-Filter Process for Large Block Boundary," Joint Video Exploration Team (JVET) of ITU-T SG 16 WP 3 and ISO/IEC JTC 1/SC 29/WG 11, 3rd Meeting:Geneva, CH, JVET-C0049_r2, pp. 1-5, International Union of Telecommunication, Geneva, Switzerland (May 26-Jun. 1, 2016).

Tourapis et al., "CE1: Summary Report on Chroma Deblocking Filtering," Joint Collaborative Team on Video Coding (JCT-VC) of ITU-T SG 16 WP 3 and ISO/IEC JTC 1/SC 29/WG 11, 22nd Meeting: Geneva, CH, JCTVC-V0021, pp. 1-8, International Union of Telecommunication, Geneva, Switzerland (Oct. 15-21, 2015).

* cited by examiner

FIG. 1 ern extensions for screen content coding and high-dynamic-range coding). The groups are working together on this exploration activity in a joint collaboration effort known as the Joint Video Exploration Team (JVET) to evaluate compression technology designs proposed by their experts in this area.

APPARATUS AND METHOD FOR DE-BLOCKING FILTERING

CROSS-REFERENCE TO RELATED APPLICATIONS

This application is a continuation of U.S. patent application Ser. No. 16/531,898, filed on Aug. 5, 2019, which is a continuation of International Application No. PCT/EP2017/057016, filed on Mar. 23, 2017. All of the aforementioned patent applications are hereby incorporated by reference in their entireties.

TECHNICAL FIELD

Embodiments of the present disclosure relate to the field of video stream processing, and more particularly to de-blocking filtering used in video stream processing in computing devices.

BACKGROUND

Video coding schemes, such as H.264/AVC and HEVC (High Efficiency Video Coding), are designed along the successful principle of block-based hybrid video coding. Using this principle a picture, or an image frame, is first partitioned into blocks and then each block is predicted by using intra-picture or inter-picture prediction. These blocks are coded using the neighboring blocks for prediction and approximate the original signal. Since coded blocks only approximate the original signal, the difference between the approximations may cause discontinuities at the prediction and transform block boundaries. These discontinuities are attenuated by the de-blocking filter. HEVC replaces the macroblock structure of H.264/AVC with the concept of coding tree unit (CTU) of maximum size 64×64 pixels. The CTU can further be partitioned into a quadtree-decomposition scheme into smaller coding units (CU), which can be subdivided down to a minimum size of 8×8 pixels. HEVC also introduces the concepts of prediction blocks (PB) and Transform blocks (TB).

De-blocking in HEVC is performed for all the edges belonging to a coding unit (CU), prediction units (PU) and transform units (TU) which overlap with an 8×8 grid. Moreover de-blocking filter in HEVC is much more parallel friendly when compared to H.264/AVC where the filter operations are performed over a 4×4 grid. The vertical and horizontal block boundaries in HEVC are processed in a different order than in H.264/AVC. In HEVC, all the vertical block boundaries in the picture are filtered first, and then all the horizontal block boundaries are filtered. Since the minimum distance between two parallel block boundaries in HEVC is eight samples, and HEVC de-blocking modifies at most three samples from the block boundary and uses four samples from the block boundary for de-blocking decisions, filtering of one vertical boundary does not affect filtering of any other vertical boundary. This means there are no de-blocking dependencies across the block boundaries. In principle, any vertical block boundary can be processed in parallel to any other vertical boundary. The same holds for the horizontal boundaries, although the modified samples from filtering the vertical boundaries are used as the input to filtering the horizontal boundaries.

Standardization organizations are studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area.

The Joint Exploration Model (JEM) describes the features that are under coordinated test model study by the Joint Video Exploration Team (JVET) as potential enhanced video coding technology beyond the capabilities of HEVC. The JEM (Joint Exploratory Model) software uses anew partitioning block structure scheme called as Quadtree plus binary tree (QTBT).

The QTBT structure removes the concepts of multiple partition types i.e. removes the separation of coding units (CU), prediction units (PU) and transform units (TU) so that CU=PU=TU. Furthermore, QTBT supports more flexible CU partition shapes wherein a CU can have either square or rectangular shape. The minimum width and height of a CU can be 4 samples and the sizes of the CU can also be 4×N or N×4 where N can take values in the range [4, 8, 16, 32].

The current luminance de-blocking filter in JEM filters all the CU block edges including the edges belonging to CU's whose size is 4×N and N×4. A drawback of this scheme is, for example, that already filtered samples can affect filtering decision of consecutive block boundary. Furthermore, adjacent block boundaries cannot be processed in parallel.

An example of the current de-blocking filter operation used for JEM, with QTBT-portioning, is shown in FIG. 1. P, Q and R are three CU's whose size is 4×8 (N=8) samples. Strong filtering of edge E1 modifies samples marked in the dashed box 100. Strong filtering of Edge E2 modifies samples marked in the dashed-dotted box 101. As we can see there is an overlap of the dashed box 100 around edge 1 and the dashed-dotted box 101 around edge 2 and therefore already filtered samples in block Q during edge E1 filtering affect filtering decision of consecutive block boundary (edge E2) and adjacent block boundaries (E1 and E2) cannot be processed in parallel.

JVET-D0044 addresses overlapping by applying filter to edges whose block width is >4 samples (for vertical edges) and edges whose block height is >4 samples (for horizontal edges). However, a drawback of this solution is that only the vertical edges belonging to blocks whose width is greater than 4 samples are filtered. Correspondingly, only the horizontal edges belonging to blocks whose height is greater than 4 samples are filtered.

In order to improve edge processing various methods have been proposed. One solution proposes changing the number of modified samples on either side of the edge based on the block size. The block size is calculated as minimum of the size of two blocks sharing the edge. A disadvantage of this approach is that filter operations are different for different block sizes which adds to the computational complexity of the approach because the block size needs to be checked always before applying the appropriate filtering operations.

As the demand for using video streams in various different types of devices is likely to increase in the future there is a continuous need for providing new methods that are computationally efficient and provide high quality video stream.

SUMMARY

In the following disclosure a system and method for processing a video stream is disclosed. When coding or decoding a video stream a de-blocking filtering may be applied for reducing discontinuities caused by use of a block-based video coding. The de-blocking filtering is performed using a filter grid. The size of the filter grid is chosen adaptively based on the processing parameters. The adaptive size of the filtering grid is determined based on the number of samples used and modified in de-blocking filtering of an edge of a coding block. The filtering grid may be used both for vertical and horizontal edge filtering.

In an aspect an apparatus for processing at least one frame of a video stream is disclosed. The apparatus comprises a memory configured to store frames of a video stream and a processor. The processor is configured to process a frame of the video stream stored in the memory using a block-based coding scheme with de-blocking filtering using a filter grid, wherein the processing of a frame of the video stream comprises coding or decoding. The processor is further configured to determine a size FxW of the filter grid, wherein F is larger than the sum of the maximum number of samples used in de-blocking filtering of a vertical edge of a coding block and the maximum number of samples modified in de-blocking filtering of a vertical edge of the coding block, and W is larger than the sum of the maximum number of samples used in de-blocking filtering of a horizontal edge of a coding block and the maximum number of samples modified in de-blocking filtering of a horizontal edge of a coding block. The processor is further configured to perform de-blocking filtering on an edge of the coding block overlapping the grid.

A benefit of the aspect described above is that the size of the filter grid can be chosen so that the number of de-blocking filtered edges with potential discontinuities will increase. A further benefit of the aspect described above is that it provides parallel friendly filtering with increased number of filtered edges with any number of used and modified samples. This will make the processing computationally simple. A further benefit of the aspect described above is that the size FxW is chosen in a manner that will allow parallel de-blocking filtering as the filtering overlap can be avoided.

In an implementation of the aspect F is further a multiple of a coding block width. It is beneficial to choose F as a multiple of the coding block width as it enables the aligning of filtering grid edges with vertical coding block edges. In an implementation W is further a multiple of a coding block height. It is beneficial to choose W as a multiple of the coding block height as it enables the aligning of filtering grid edges with horizontal coding block edges.

In an implementation of the aspect, the coding block is a coding unit, prediction unit or transform unit. Allowing the coding block to be a coding unit, prediction unit or transform unit increases flexibility. In an implementation of the aspect the coding block is the smallest of a coding unit, prediction unit or transform unit. When the smallest is chosen as a coding block it is guaranteed that the filtering grid is at least of the same size as the smallest filtered coding block.

In an implementation of the aspect F equals W. When F equals W the implementation is particularly simple and fulfills the requirements of current standards. This increases the compatibility of the de-blocking filtering method. In an implementation of the aspect the de-blocking filter is a luminance de-blocking filter. Using a luminance de-blocking filter is particularly beneficial as it improves image quality.

In an implementation of the aspect the apparatus is configured to determine the size of filter grid adaptively. It is particularly beneficial to determine the size of the filter grid adaptively as the coding block size may change. By adapting the filter grid size accordingly the number of de-blocking filtered edges is increased. In an implementation of the aspect values of F and W are at least eight and divisible by four. It is particularly beneficial that the values F and W can be chosen according to the need of the current video stream. This increase flexibility of the method and at the same time the principle increases the number of de-blocking filtered edges.

In another aspect a method for processing at least one frame of a video stream is disclosed. The method comprises processing a frame of the video stream stored in the memory using a block-based coding scheme with de-blocking filtering using a filter grid, wherein the processing of a frame of the video stream comprises coding or decoding; and determining the size FxW of the filter grid, wherein F is larger than the sum of the maximum number of samples used in de-blocking filtering of a vertical edge of a coding block and the maximum number of samples modified in de-blocking filtering of a vertical edge of the coding block; and W is larger than the sum of the maximum number of samples used in de-blocking filtering of a horizontal edge of a coding block and the maximum number of samples modified in de-blocking filtering of a horizontal edge of a coding block. The method further comprises performing de-blocking filtering on an edge of the coding block overlapping the grid.

A benefit of the aspect described above is that the size of the filter grid can be chosen so that the number of de-blocking filtered edges will increase. A further benefit of the aspect described above is that the number of used and modified samples does not need to be changed. This will make the processing computationally simple. A further benefit of the aspect described above is that the size FxW is chosen in a manner that will allow parallel de-blocking filtering as the filtering overlap can be avoided.

In an implementation of the aspect F is further a multiple of a coding block width. It is beneficial to choose F as a multiple of the coding block width as it enables the aligning of filtering grid edges with coding block edges. In an implementation W is further a multiple of a coding block height. It is beneficial to choose W as a multiple of the coding block height as it enables the aligning of filtering grid edges with coding block edges.

In an implementation of the aspect the coding block is a coding unit, prediction unit or transform unit. Allowing the coding block to be a coding unit, prediction unit or transform unit increases flexibility. In an implementation of the aspect the coding block is the smallest of a coding unit, prediction unit or transform unit. When the smallest is chosen as a coding block it is guaranteed that the filtering grid is at least of the same size as the smallest filtered coding block.

In an implementation of the aspect F equals W. When F equals W the implementation is particularly simple and fulfills the requirements of current standards. This increases the compatibility of the de-blocking filtering method. In an implementation of the aspect the method further comprises de-blocking filtering using a luminance de-blocking filter. Using a luminance de-blocking filter is particularly beneficial as it improves image quality.

In an implementation of the aspect the method determines the size of filter grid adaptively. It is particularly beneficial to determine the size of the filter grid adaptively as the coding block size may change. By adapting the filter grid size accordingly the number of de-blocking filtered edges with potential discontinuities is increased. In an implementation of the aspect values of F and W are at least eight and divisible by four. It is particularly beneficial that the values F and W can be chosen according to the need of the current video stream. This increase flexibility of the method and at the same time the principle increases the number of de-blocking filtered edges.

In a further aspect a computer program is disclosed. In the aspect the computer program comprises a program code configured to perform a method according to embodiments of the present disclosure, when the computer program is executed on a computing device. It is beneficial that to implement the method as a computer program so that can be easily implemented in various different computing devices, such as mobile phones, tablet computers, laptop computers and other computing devices.

Principles described above are sufficient for satisfying parallel de-blocking condition(s) ensuring two important benefits. The first benefit is that de-blocking filter operation of two adjacent vertical or horizontal edges do not overlap. The second benefit is that the vertical edge filtering and horizontal edge filtering are completely parallelizable.

BRIEF DESCRIPTION OF THE DRAWINGS

The present description will be better understood from the following detailed description read in light of the accompanying drawings, wherein:

FIG. 1 illustrates filter operation overlap with block size 4×8;

DETAILED DESCRIPTION

The detailed description provided below in connection with the appended drawings is intended as a description of the embodiments and is not intended to represent the only forms in which the embodiment may be constructed or utilized. However, the same or equivalent functions and structures may be accomplished by different embodiments.

Figure 2:
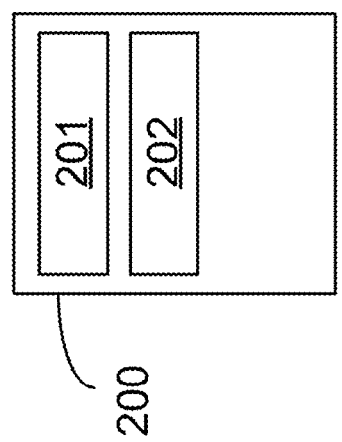
FIG. 2 illustrates an example of an apparatus with adaptive de-blocking filtering.

FIG. 2 illustrates an example of an apparatus 200 comprising adaptive de-blocking filtering. The apparatus 200 comprises at least one processor 201 and at least one memory 202. The apparatus may be, for example, a mobile phone, a table computer, laptop, ordinary computer television set, or any other similar device that may be used for coding and decoding a video stream. The apparatus is connectable with other devices in order to receive a video stream or material for producing a video stream that is then processed accordingly.

The processor 201 is configured to process a frame of the video stream stored in the memory 202 using a block-based coding scheme with de-blocking filtering using a filter grid, wherein the processing of a frame of the video stream comprises coding or decoding. The processor 201 is further configured to determine a size F×W of the filter grid, wherein F is larger than the sum of the maximum number of samples used in de-blocking filtering of a vertical edge of a coding block and the maximum number of samples modified in de-blocking filtering of a vertical edge of the coding block, and W is larger than the sum of the maximum number of samples used in de-blocking filtering of a horizontal edge of a coding block and the maximum number of samples modified in de-blocking filtering of a horizontal edge of a coding block. The processor is further configured to perform de-blocking filtering on an edge of the coding block overlapping the grid.

A sufficient condition for allowing parallel de-blocking is achieved with following principle. Furthermore, in addition to the parallel de-blocking an increased number of de-blocking filtered edges is achieved. The sufficient condition takes as input the number of samples "used (U)" and the number of samples "modified (M)" by the de-blocking filter as input and then derives an output "minimum grid size (F×W)" on which the de-blocking filter can be operated upon to ensure "parallelizability" and "no filter operation overlap".

In the example de-blocking filtering operations according to the JEM are used. The filter may be, for example, the luminance de-blocking filter. Instead of the luminance de-blocking filter also other suitable filters may be used, such as, a chrominance de-blocking filter. These are similar to that of HEVC therefore the maximum number of samples used is 4 (U=4) and maximum number of samples modified is (M=3). Applying the sufficient condition for parallel de-blocking gives a condition that F has to be larger than the sum U+M, which is 7 with the given values. Thus, the value of F has to be at least 8. As explained above F is related to de-blocking of vertical edges. If the numbers of used and modified samples are the same also in de-blocking horizontal edges the value of W may be the same 8. Therefore, applying the sufficient condition for parallel de-blocking gives a resulting filtering grid of 8×8.

In the described scheme, the determination of the grid size is performed at both the encoder and decoder side. In general, performing computation on both the encoder and decoder side may be disadvantageous since it may affect the performance of the device, in particular the end device. However the operation for determining the size of the grid is not computationally intensive and can be implemented without sensibly increasing the computational load of the device.

The determination of the grid size may alternatively be done only at the encoder and signaled to the decoder. Signaling could be done once per sequence adding an additional bit to the pictures parameters such as in the slice header.

However, the principles explained here are also applicable with other similar schemes. Furthermore, even if in the description it is assumed that samples are used and modified symmetrically on both sides of processed edges it is possible that samples are used and/or modified asymmetrically. For example, it is possible that the number of used samples on the left side of the edge is 2 and on the right side of the edge 3. In such a case the value of U (samples used) may be taken as a maximum of the value between samples used on the right side and samples used on the left hand side of the edge. Similar principles may be applied to both vertical and horizontal edges. Furthermore, it is possible that the number of used and modified samples are different for vertical and horizontal edges. Thus, the size of filtering grid may vary according to the principles provided in this description.

Figure 1:
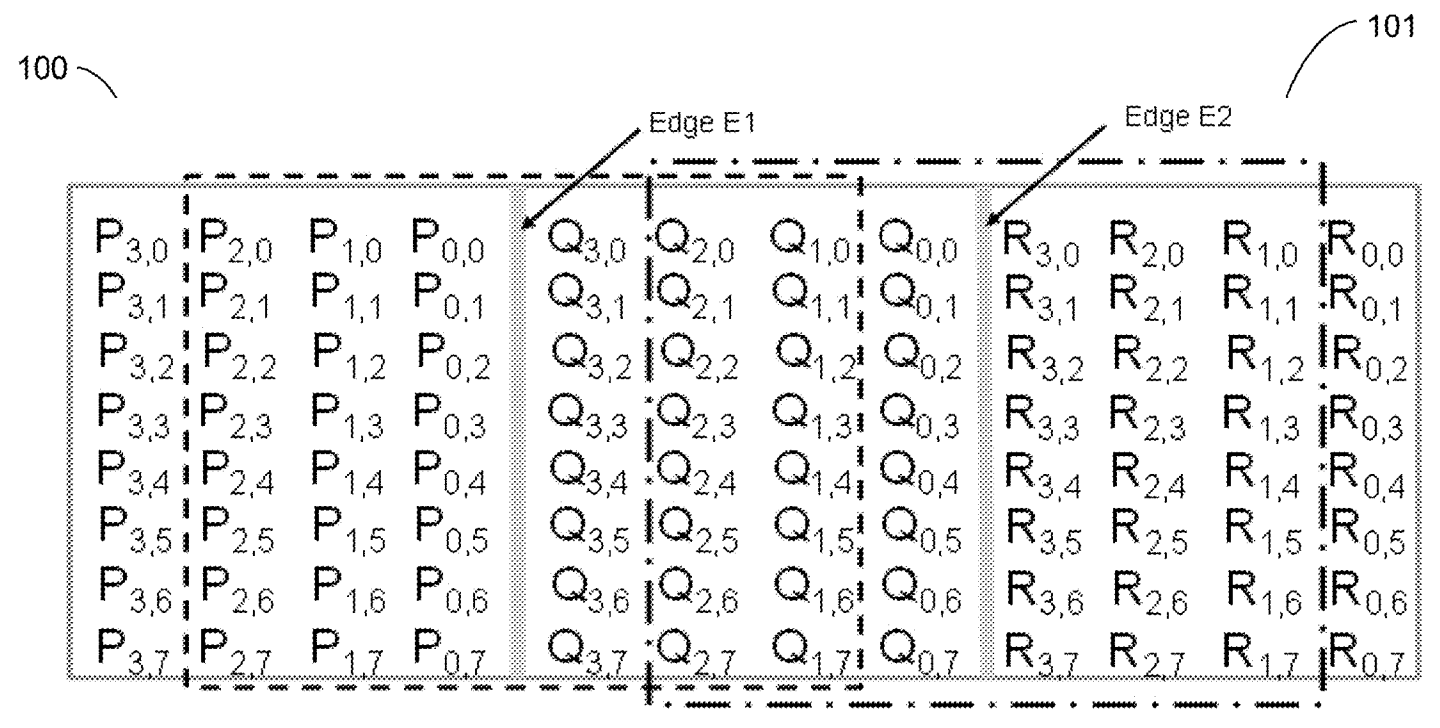

In an implementation of the aspect F is further a multiple of a coding block width. In an implementation W is further a multiple of a coding block height. In the example of U=4 and M=3 explained above de-blocking filtering used for JEM is applied. Furthermore, in FIG. 1 it is shown that the coding block, which is a coding unit in case of JEM, is of size 4×8 samples. As the grid is 8×8, the conditions of being multiple of coding block width and height are met as 8 is a multiple of 4.

In the above the size of the filter grid is described in relation of a coding block. In the Quadtree plus binary tree (QTBT) approach used by JEM the concepts of multiple partition types are removed. Thus, there is no difference between coding units (CU), prediction units (PU) and transform units (TU), which allows flexible coding unit partition shapes. However, the principles provided apply also in other approaches and the coding block used for determining the filter grid size may be a coding unit, prediction unit or transform unit. Typically the smallest of coding unit, prediction unit or transform unit is used as a coding block.

The size of the filtering grid may be determined adaptively. This adds flexibility as the parameters used in the video stream processing may change. For example, the number of samples used and modified bits may change and thus the grid need to be changed so that it will fulfill the conditions explained above again. The number of samples used and modified may be determined by the standard, however, they may also vary according to the principles of the standard. For example, the standard may dictate that the parameters are included in the video stream and/or the entity producing the video stream may need to determine the number of samples that need to be used. Furthermore, the de-blocking filtering may be done when decoding a video stream, in which case the de-blocking filtering is performed for an uncompressed frame of the video stream as the uncompressed frame may and typically comprises edges that should be filtered using a de-blocking filtering.

As described above the principles discussed above participate to video stream processing, either coding or decoding. Thus, it needs to take also other principles used in video processing into account. Thus, typically values for F and W are at least 8 and divisible by four, i.e. 8, 12, 16, 20, 24, 28, 32 or similar larger value.

Figure 3:
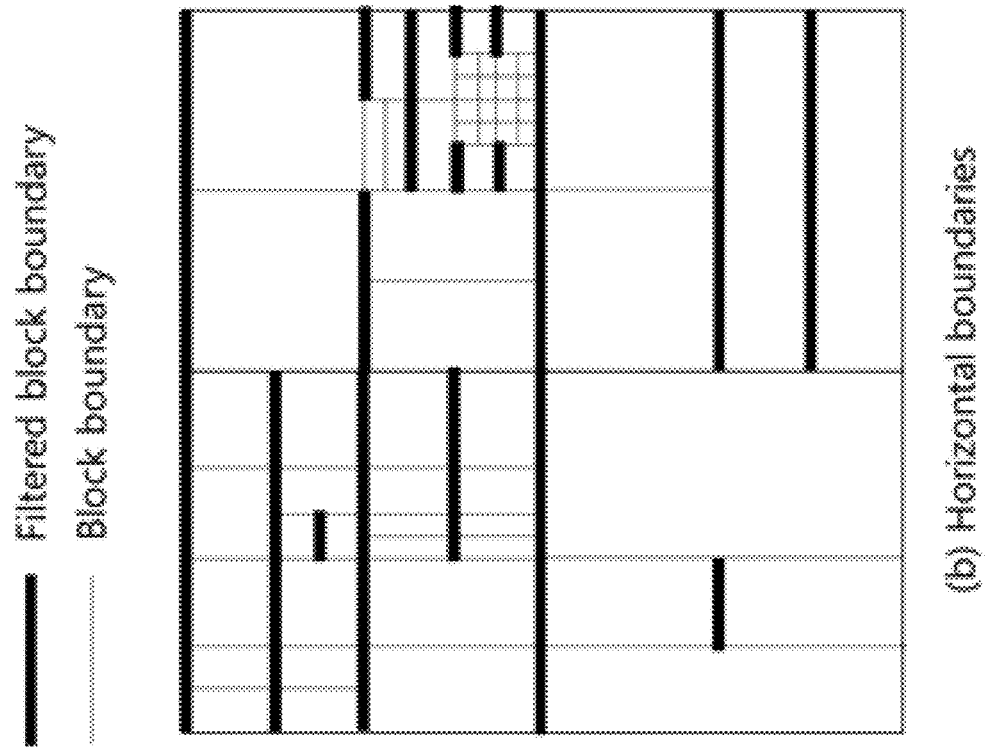
FIG. 3 is an exemplary illustration of de-blocking filtering.
Figure 3:
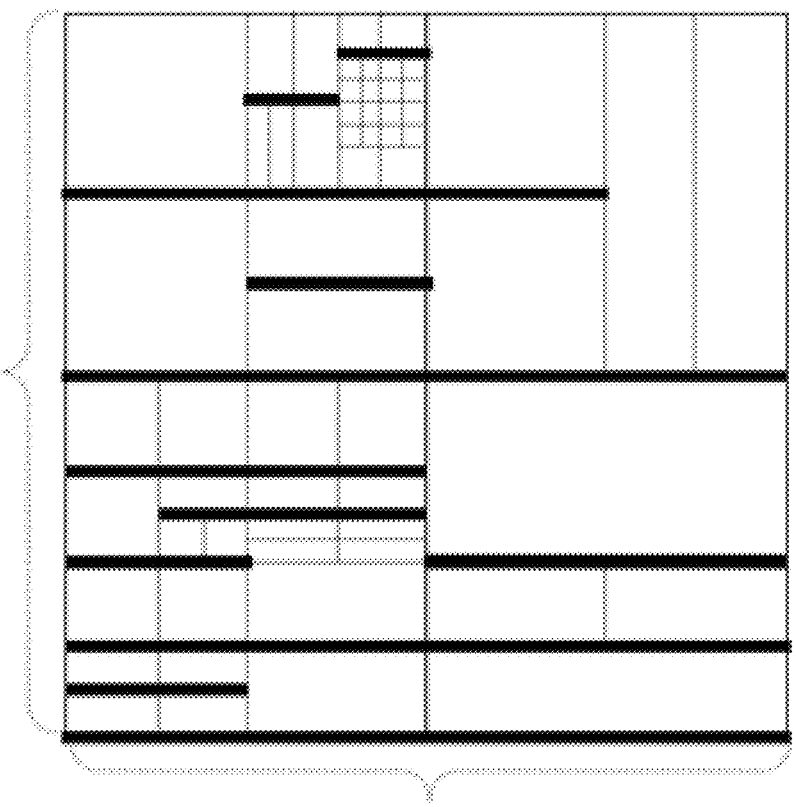

In FIGS. 3-5 it is further illustrated how the principles described above perform in the exemplary conditions of FIGS. 3-5. FIG. 3 illustrates the starting point as it would be according to a currently used scheme, wherein edges whose block width is >4 samples (for vertical edges) an edges whose block height is >4 samples (for horizontal edges) are filtered. In FIG. 3 the de-blocking filtering of vertical edges and horizontal edges are shown as a two separate frames for the sake of clarity. A person skilled in the art would understand that the left frame illustrating vertical boundaries, in other words vertical edges, and the right frame illustrating the horizontal boundaries, in other words horizontal edges, belong to the same video frame.

As depicted in FIG. 3, in the proposal JVET-D0044 only the vertical edges belonging to blocks whose width is greater than 4 samples are filtered. Correspondingly only the horizontal edges belonging to blocks whose height is greater than 4 samples are filtered.

Figure 4:
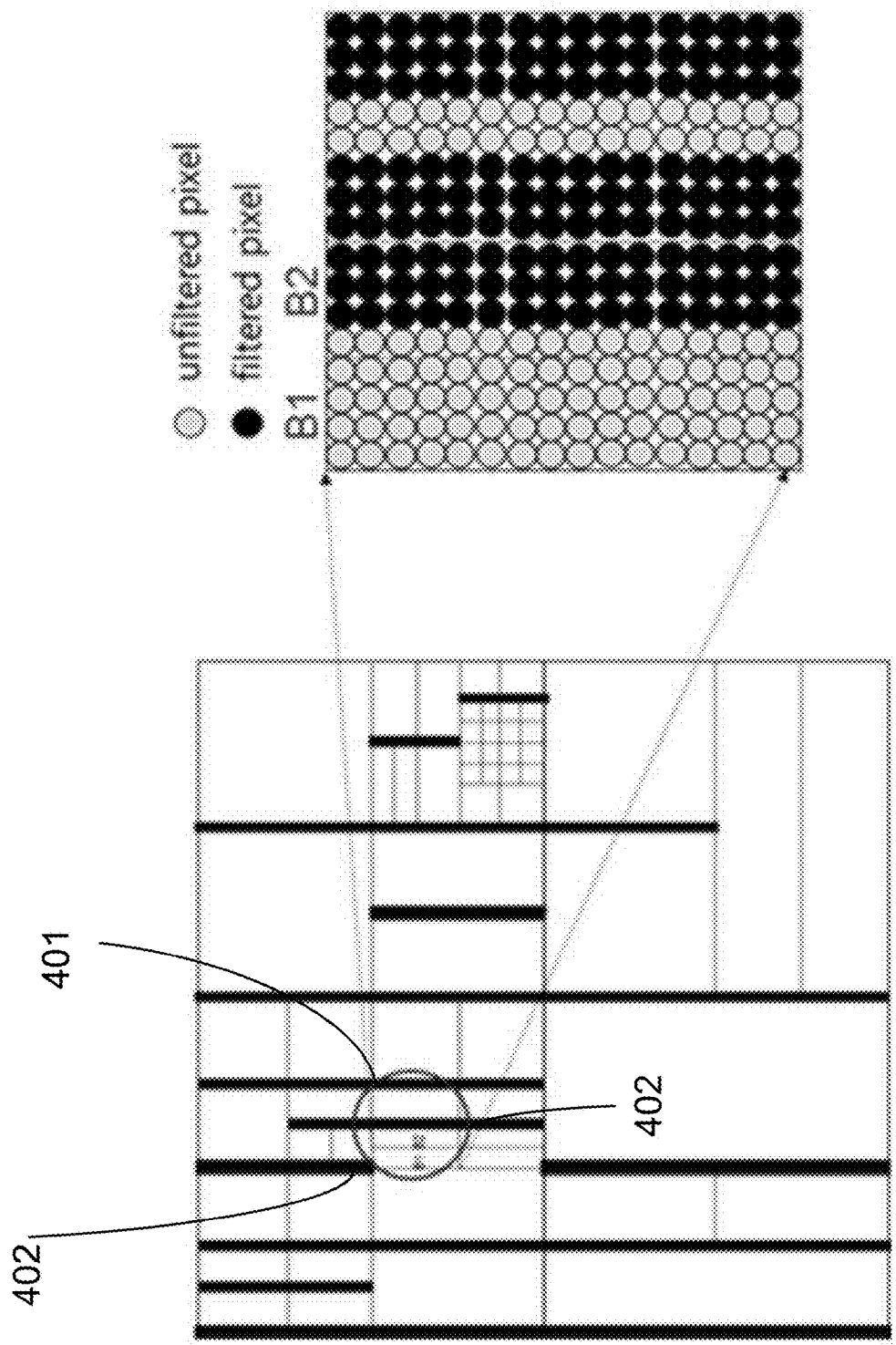
FIG. 4 is an exemplary illustration of de-blocking filtering.

In FIG. 4 it is shown that using the principles used in FIG. 3 vertical edges 400 (B1) and 401 (B2) are not filtered. This is because the size of the coding block varies over the video frame and the block width, or height, may be 4 samples. Thus, the condition of ">4 samples" is not met and the block is not filtered. In FIG. 4, the region circled by the circle 402 shows two edges 400 and 401 and the respective blocks B1 and B2. The same region is expanded as 16×16 region with the respective samples.

Filtering the edges as done in JEM (QTBT) might result in undesired results in the de-blocking decision and filtering process because de-blocking filter uses a maximum of 4 samples in decision process and can modify up to a maximum of 3 samples on either side of the edge. Thus, the edges 400 and 401 (for blocks B1 and B2) are not filtered as the block width is 4 samples for both edges. Thus, some edges with potential discontinuities are not de-blocked.

Figure 5:
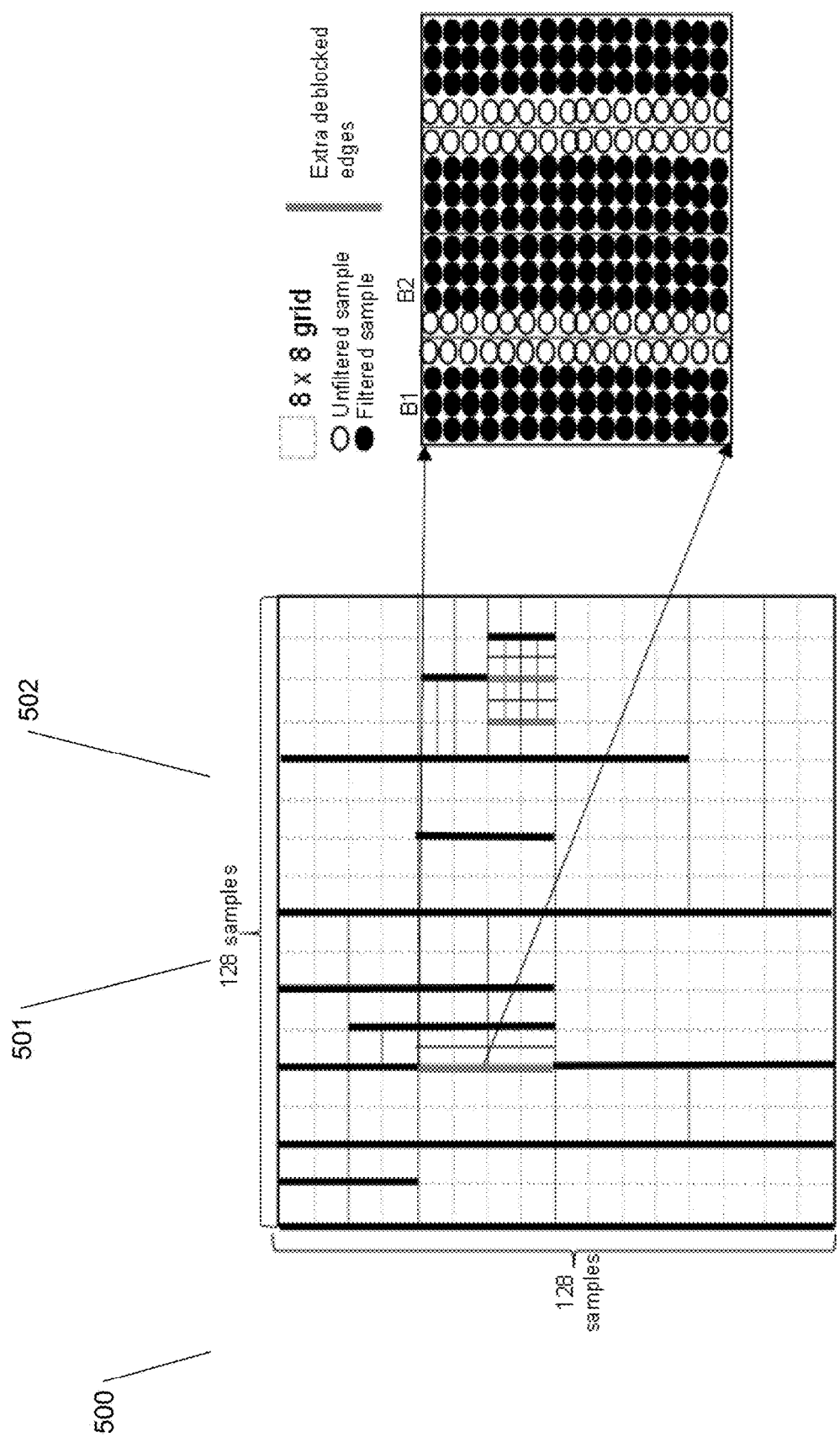
FIG. 5 is an exemplary illustration of de-blocking filtering.

In FIG. 5 an adaptive filtering grid is used in similar conditions. As explained above the filtering grid of 8×8 fulfills the conditions when edges are filtered as done in JEM.

Blocks B1 and B2 correspond with the blocks B1 and B2 of FIG. 4. Edge 500 (in the dashed circle) corresponds with the edge 400 of FIG. 4. As it can be seen when 8×8 filtering grid is used, the conditions for filtering the edge 500 are met and the edge 500 is filtered. Correspondingly edges 501 and 502, which are not filtered in the example of FIG. 4, are filtered in the example of FIG. 5. Thus, in addition to enabling parallel processing of coding blocks the number of filtered edges are increased. In the examples of FIGS. 3-5 only vertical edges are illustrated, however, the similar principles may be applied also to horizontal edges.

Figure 6:
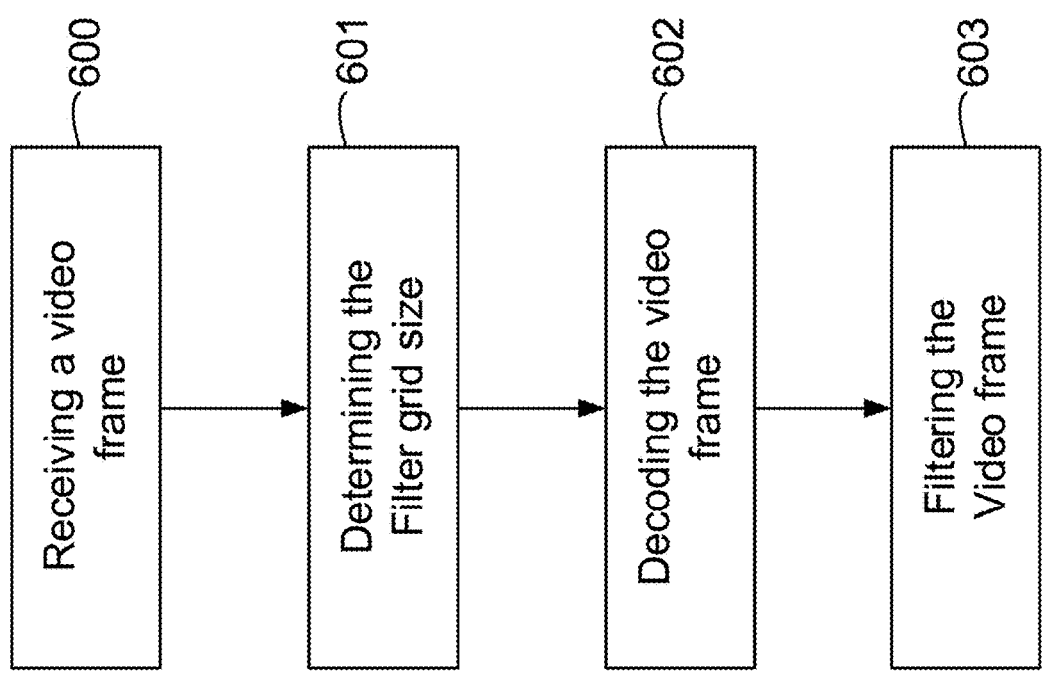
FIG. 6 is an exemplary illustration of method for de-blocking filtering.

In FIG. 6 a flow chart of an exemplary method is illustrated. In the flowchart a method for decoding a video frame is illustrated. In the method first a video frame is received, step 600. The frame is typically a part of a plurality of video frames forming a video stream. The frame is decoded using known principles, for example similar to the one explained above together with the apparatus. This steps can be performed in an encoder or in a decoder. In the case the method is performed at the encoder the received video frame is the uncompressed video data and this data is decoded in-loop to generate the prediction which will be coded in the bit-stream transmitted to a decoder along with residual and side information. In the case of the decoder, the received video frame may be a coded bit stream received from an encoder. Based on the received video frame the filter grid size is determined, step 601. The filter grid size is determined based on the information on the number of samples used and modified when a de-blocking filter is applied on the video frame. Information of samples used may be received together with the video frame as side information or as a separate information at the beginning of a plurality of video frames. The received information may also contain an indication of the preferred filter grid size. Depending on the coding scheme using the preferred filter grid size may be mandatory or optional. Furthermore, it is also possible that the respective numbers of samples used and modified are set by the decoding entity. Then, the video frame is decoded, step 602. Decoding includes also uncompressing the video frame. Thus, the result of decoding is an image that can be displayed on a display, however, before displaying the frame it is filtered using a de-blocking filter, step 603.

As explained above the de-blocking filtering may be implemented as a hardware, such as the apparatus as described above, or as a method. The method may be implemented as a computer program. The computer program is then executed in a computing device for processing a video stream. The computing device may be used for coding or decoding a video stream comprising a plurality of video frames.

The apparatus and method for de-blocking filtering has been described in conjunction with various embodiments herein. However, other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

What is claimed is:

1. An apparatus for processing at least one frame of a video stream, the apparatus comprising:
   a memory configured to store frames of the video stream; and
   a processor configured to process a frame of the video stream stored in the memory using a block-based coding scheme that includes de-blocking filtering using a filter grid, wherein the processing of the frame of the video stream comprises coding or decoding;
   wherein the processing includes dynamically determining a size FxW of the filter grid based on numbers of filter input and output samples during execution of processing of the frame,
   (a) wherein the filter output samples are samples modified by the processing,
   (b) wherein F is larger than a sum of a maximum number of filter input samples of a de-blocking filter process of a vertical edge of a coding block and a maximum number of modified samples of the de-blocking filter process of the vertical edge of the coding block, and
   (c) wherein W is larger than a sum of a maximum number of filter input samples of the de-blocking filter process of a horizontal edge of the coding block and the maximum number of modified samples of the de-blocking filter process of the horizontal edge of the coding block; and
   wherein the processor is further configured to perform the de-blocking filtering on an edge of the coding block overlapping the filter grid, wherein the edge of the coding block overlapping the filter grid comprises the vertical edge of the coding block and/or the horizontal edge of the coding block.

2. The apparatus according to claim 1, wherein the determined size FxW of the filter grid is 4×4.

3. The apparatus according to claim 1, wherein the determined size FxW of the filter grid is 8×8.

4. The apparatus according to claim 1, wherein the coding block is a coding unit, a prediction unit or a transform unit.

5. The apparatus according to claim 1, wherein the coding block is the smallest of a coding unit, a prediction unit or a transform unit.

6. The apparatus according to claim 1, wherein F equals W.

7. The apparatus according to claim 1, wherein the de-blocking filter process uses a luminance de-blocking filter.

8. A method for processing at least one frame of a video stream, applied to an apparatus comprising a memory and a processor, the method comprising:
   storing, by the memory of the apparatus, frames of the video stream; and
   processing, by the processor of the apparatus, a frame of the video stream stored in the memory using a block-based coding scheme that includes de-blocking filtering using a filter grid, wherein the processing of the frame of the video stream comprises coding or decoding;
   wherein the processing includes dynamically determining, by the processor of the apparatus, a size FxW of the filter grid based on numbers of filter input and output samples during execution of the processing of the frame,
   (a) wherein the filter output samples are samples modified by the processing,
   (b) wherein F is larger than a sum of a maximum number of filter input samples of the de-blocking filter process of a vertical edge of a coding block and a maximum number of modified samples of the de-blocking filter process of the vertical edge of the coding block, and
   (c) wherein W is larger than a sum of a maximum number of filter input samples of the de-blocking filter process of a horizontal edge of the coding block and a maximum number of modified samples of the de-blocking filter process of the horizontal edge of the coding block; and
   wherein the method further comprises: performing the de-blocking filtering on an edge of the coding block overlapping the filter grid, wherein the edge of the coding block overlapping the filter grid comprises the vertical edge of the coding block and/or the horizontal edge of the coding block.

9. The method according to claim 8, wherein the determined size FxW of the filter grid is 4×4.

10. The method according to claim 8, wherein the determined size FxW of the filter grid is 8×8.

11. The method according to claim 8, wherein the coding block is a coding unit, a prediction unit or a transform unit.

12. The method according to claim 8, wherein the coding block is the smallest of a coding unit, a prediction unit or a transform unit.

13. The method according to claim 8, wherein F equals W.

14. The method according to claim 8, wherein the de-blocking filter process uses a luminance de-blocking filter.

15. A non-transitory computer-readable medium comprising a program code which when executed by a processor of a computing device, causes the computing device to perform a method for processing at least one frame of a video stream, the method comprising:
   storing frames of the video stream in a memory; and
   processing a frame of the video stream stored in the memory using a block-based coding scheme that includes de-blocking filtering using a filter grid, wherein the processing of the frame of the video stream comprises coding or decoding;
   wherein the processing includes dynamically determining a size FxW of the filter grid based on numbers of filter input and output samples during execution of the processing of the frame,
   (a) wherein the filter output samples are samples modified by the processing,
   (b) wherein F is larger than a sum of a maximum number of samples of a de-blocking filter process of a vertical edge of a coding block and a maximum number of modified samples of the de-blocking filter process of the vertical edge of the coding block; and
   (c) wherein W is larger than a sum of a maximum number of filter input samples of the de-blocking filter process of a horizontal edge of the coding block and a maximum number of modified samples of the de-blocking filter of a horizontal edge of the coding block; and wherein the method further comprises: performing the de-blocking filtering on an edge of the coding block overlapping the filter grid, wherein the edge of the coding block overlapping the filter grid comprises the vertical edge of the coding block and/or the horizontal edge of the coding block.

16. The non-transitory computer-readable medium according to claim 15, wherein the determined size FxW of the filter grid is 4×4.

17. The non-transitory computer-readable medium according to claim 15, wherein the determined size FxW of the filter grid is 8×8.

* * * * *

UNITED STATES PATENT AND TRADEMARK OFFICE
CERTIFICATE OF CORRECTION

PATENT NO. : 11,991,399 B2
APPLICATION NO. : 17/516308
DATED : May 21, 2024
INVENTOR(S) : Kotra et al.

It is certified that error appears in the above-identified patent and that said Letters Patent is hereby corrected as shown below:

In the Claims

Claim 15: Column 10, Line 67: "filter of a horizontal edge of the coding block; and" should read -- filter process of a horizontal edge of the coding block; and --.

Signed and Sealed this
Eighth Day of April, 2025

Coke Morgan Stewart
*Acting Director of the United States Patent and Trademark Office*